United States Patent
Baggett et al.

(10) Patent No.: US 9,936,682 B1
(45) Date of Patent: Apr. 10, 2018

(54) GO ANYWHERE FISHING REEL LINE LOADER

(71) Applicants: Stephen Douglas Baggett, Cape Canaveral, FL (US); William Charles Baggett, Colorado Springs, CO (US)

(72) Inventors: Stephen Douglas Baggett, Cape Canaveral, FL (US); William Charles Baggett, Colorado Springs, CO (US)

( * ) Notice: Subject to any disclaimer, the term of this patent is extended or adjusted under 35 U.S.C. 154(b) by 0 days.

(21) Appl. No.: 15/530,144

(22) Filed: Dec. 7, 2016

(51) Int. Cl.
*A01K 89/00* (2006.01)
*F16B 47/00* (2006.01)
*B65H 49/20* (2006.01)
*B65H 49/32* (2006.01)

(52) U.S. Cl.
CPC ......... *A01K 89/003* (2013.01); *B65H 49/205* (2013.01); *B65H 49/325* (2013.01); *F16B 47/00* (2013.01)

(58) Field of Classification Search
CPC .. A01K 89/003; B65H 49/205; B65H 49/325; B65H 59/04; B65H 59/043
See application file for complete search history.

(56) References Cited

U.S. PATENT DOCUMENTS

| | | | | |
|---|---|---|---|---|
| 4,316,588 A | * | 2/1982 | Walthall | B65H 49/32 242/129.62 |
| 4,717,086 A | * | 1/1988 | Crow | A01K 89/003 242/394.1 |
| 4,762,286 A | * | 8/1988 | Crow | A01K 89/003 242/486.9 |
| 4,948,059 A | * | 8/1990 | Lewitt | A01K 89/003 242/129.6 |
| 5,209,423 A | * | 5/1993 | Barginear | A01K 89/003 242/129.8 |
| 5,544,839 A | * | 8/1996 | Burch | A01K 89/003 242/396.6 |

* cited by examiner

*Primary Examiner* — William E Dondero

(57) ABSTRACT

A device for loading a fishing reel with line from a line supply spool by a single person. This device has a base with two side walls with corresponding holes, a plastic bendable tension rod, and suction cups attached to the bottom of the base. The tension rod produces downward pressure on supply spool when threaded through side wall hole, then through center hole of supply spool, then through corresponding through hole on the other side wall, holding it in place. The tension rod when in place as above also produces tension on fishing line which can be loaded to reel by attaching line to reel through rod guides and turning reel crank. The suction cups attached to base allow line loader to be used by one person anywhere you have a non-porous surface.

7 Claims, 4 Drawing Sheets

GO ANYWHERE FISHING REEL LOADER

(1) BACKGROUND OF THE INVENTION (A) This invention is a new and unique way to load fishing line onto a fishing reel when by yourself.

(B) Many times a fisherman will find themselves alone at home or alone in the field and have to reload a fishing reel spool and have no means to do so without help. There are several problems involved when trying to fill a fishing reel spool, especially when by yourself or alone in the field. It is hard to keep the line supply spool stationary and difficult to be able to put pressure on a line supply spool to allow tight winding onto a fishing reel spool. Also it is hard working with different sized line supply spools. There are many different sizes both in width and height. Additionally, a fishing reel line loader should be able to be used with all types of fishing reels and line test.

(2) BRIEF SUMMARY OF THE INVENTION

The object of this invention is to allow one person, acting by themselves to load a fishing reel almost anywhere. The invention consist of a plastic base with two opposing wall rising from each end of the base and each opposing wall has holes passing through it at various heights. The holes in the right wall correspond to the holes in the left wall. There is also a bendable plastic rod with a handle on one end. This rod can be threaded through a hole in one wall which is lower than the center hole of a line supply spool, then through a line supply spool and finally down and through the corresponding hole in the other wall. The bendable plastic rod puts downward pressure on a line supply spool to hold it firmly in place. This downward pressure also allows for tight winding of line onto a fishing reel spool. The multiple holes on either wall allow the user to apply differing amounts of downward pressure and for the use of different line supply spools. The Go Anywhere Fishing Reel Line Loader's downward pressure on the line supply spool allows it to work with any type rod and reel or line test. This line loader also has suction cups attached to the bottom of its base which will stick to any non-porous surface holding it firmly in place, thus allowing a single person to load fishing line to their reel almost anywhere. It is also made entirely of plastic and can never rust and is resistant to decay.

(3) BRIEF DESCRIPTION OF THE DRAWINGS

Figure 1:
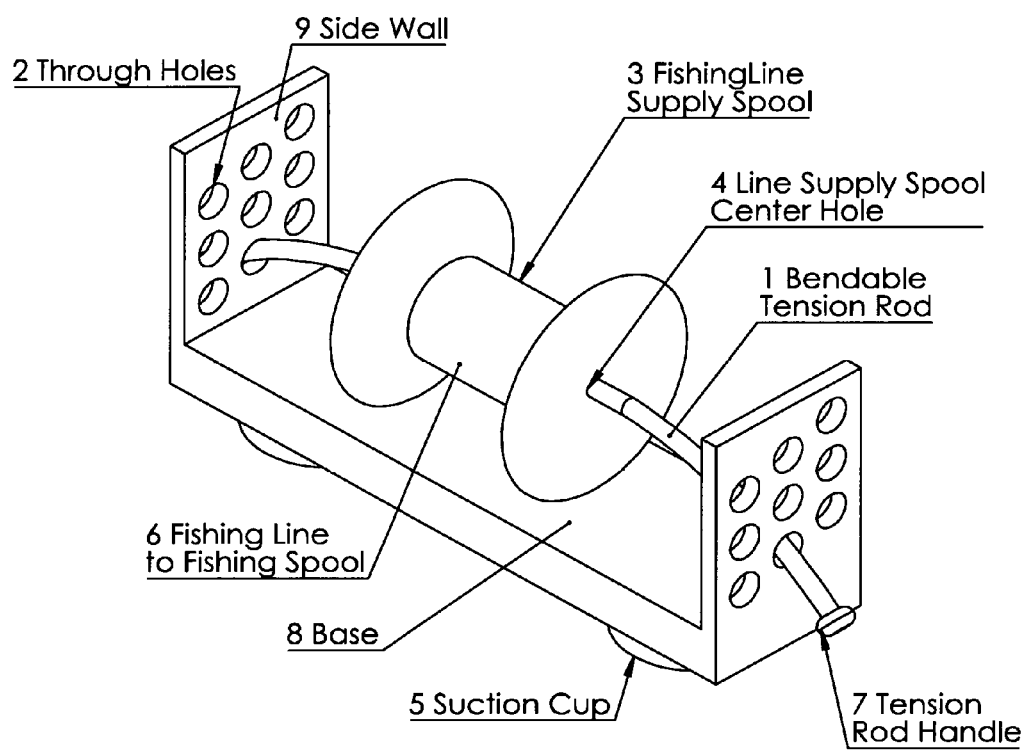

FIG. 1 The assembled Go Anywhere Fishing Reel Line Loader depicting the base, side walls with through holes, the plastic bendable tension rod with handle, suction cups, and line supply spool in place with center hole and fishing line leading to fishing reel spool.

Figure 2:
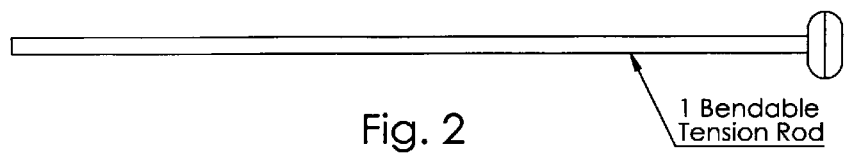

FIG. 2 Plastic bendable tension rod

Figure 3:
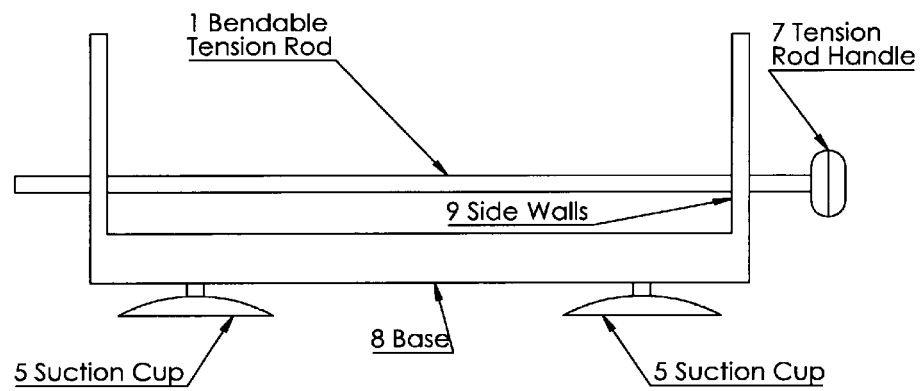

FIG. 3 Front view of base and side walls with plastic bendable tension rod passing through through holes and suction cups attached to bottom of base.

Figure 4:
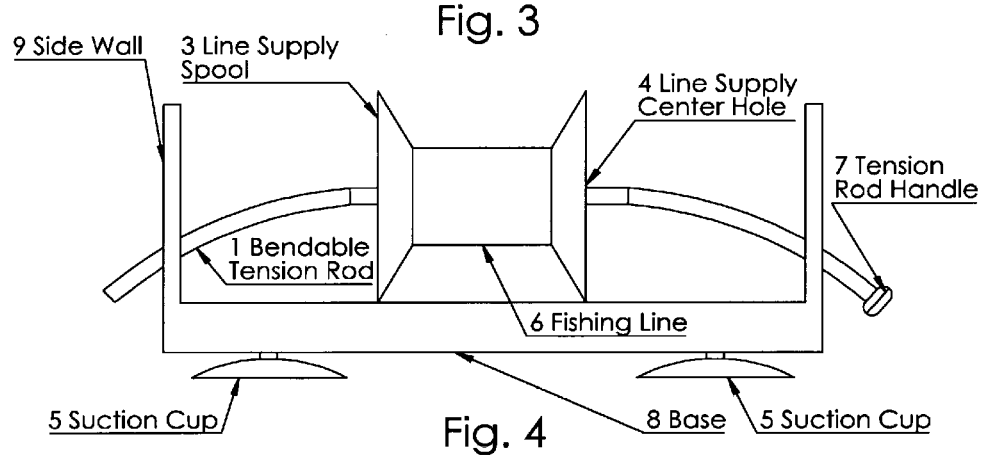

FIG. 4 Front view of base and side walls with plastic bendable tension rod passing through side walls and center hole of line supply spool. Fishing line on line supply spool and suction cups attached to bottom of base.

Figure 5:
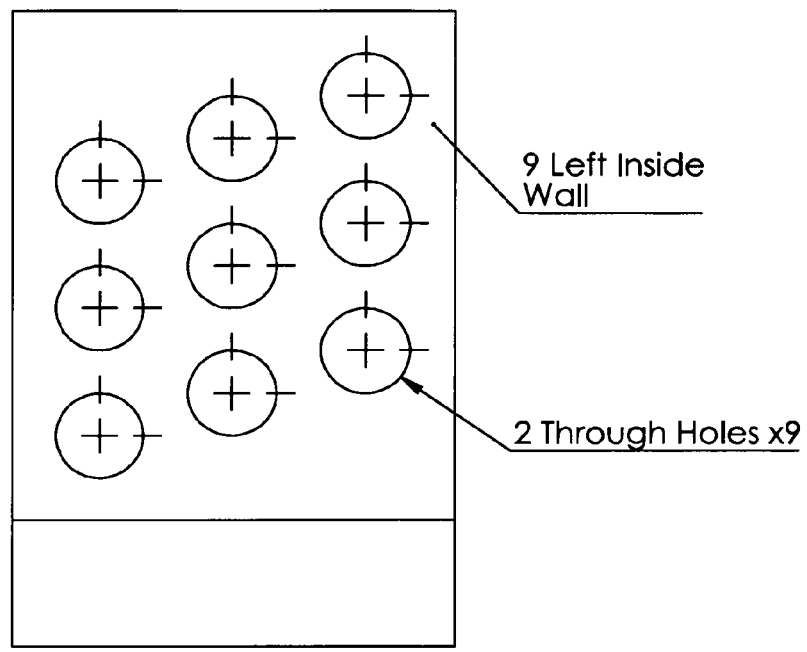

FIG. 5 Left side wall inside view

Figure 6:
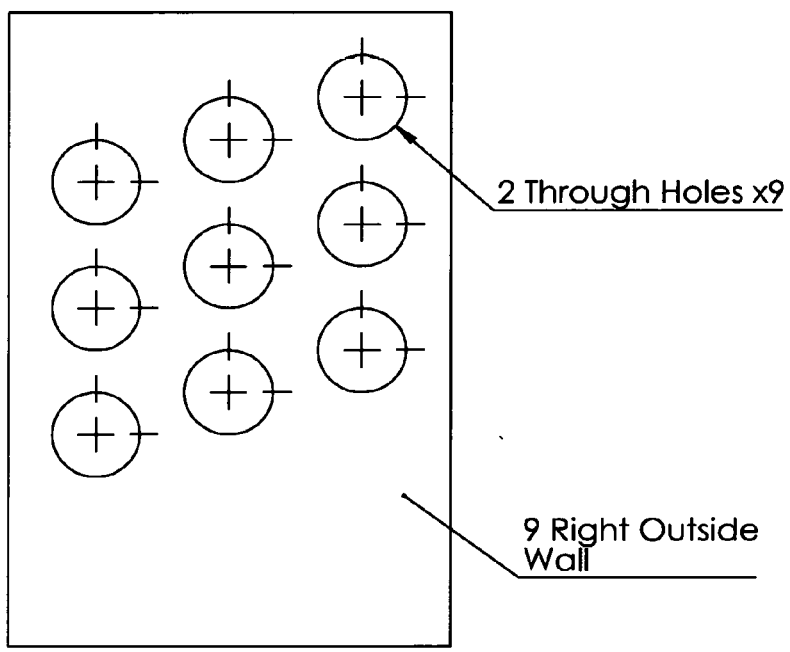

FIG. 6 Right side wall outside view

Figure 7:
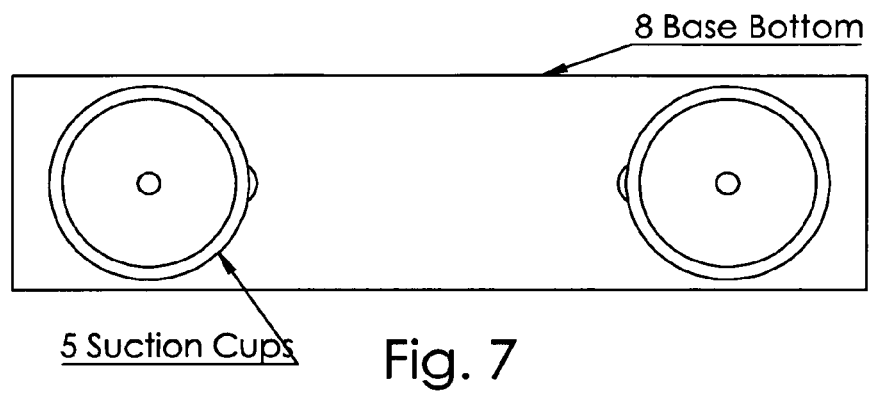

FIG. 7 Bottom of base with suction cups

Figure 8:
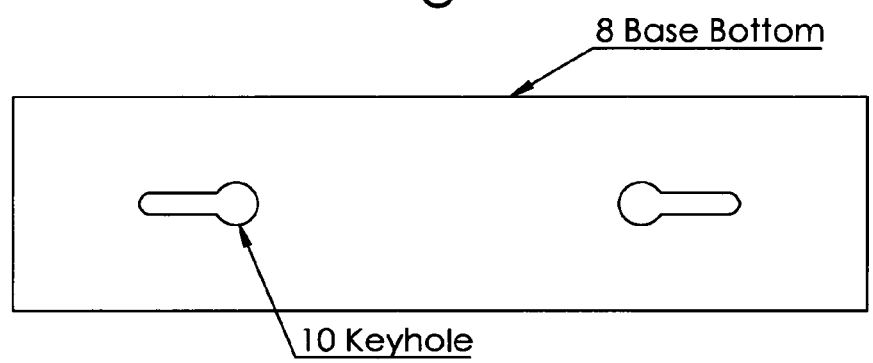

FIG. 8 Bottom of base depicting the keyhole fittings for suction cups

Figure 9:
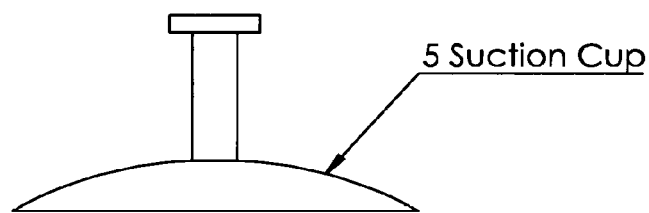

FIG. 9 Profile of suction cups

(4) DETAILED DESCRIPTION OF THE INVENTION

Referring to FIG. 1 the Go Anywhere Fishing Reel Line Loader has three components working in conjunction which will allow a single person to load a fishing reel with line almost anywhere. These components are the base(8) with two side walls(9) rising on each end with corresponding through holes(2), a plastic bendable tension rod(1) with a handle(7) and suction cups(5). These three components provide line supply spool(3) stability and tension for tight winding of fishing line(6) onto fishing reel spool (not shown) and the ability to firmly attach the disclosed invention anywhere you have a non-porous surface. The attachment could be on a table, door, counter top, car hood, car window, car or boat windshield, or any smooth surface on a boat.

The base(8) consist of a rectangular platform at least 6 inches in length and 2 inches in width with two opposing side walls(9) rising from each end. Each opposing side wall(9) has 9 through holes(2) which correspond to 9 through holes(2) on the opposite sidewall(9). This is a preferred embodiment and any amount of holes or configuration of holes could be used.

There is a plastic bendable tension rod(1) with a small round handle(7). This handle could take any size, shape, or form. The plastic bendable tension rod(1) is longer than the base(8) and is capable of passing through one side wall(9), then passing through center hole of a line supply spool(4) and then passing through and protruding out of the other corresponding through hole(2) in opposing side wall(9). The plastic bendable tension rod(1) may be made of any material although plastic is the preferred embodiment. The only requirement is that it is bendable.

In the preferred embodiment there are two suction cups(5) attached to the bottom of the base(8) by keyhole fittings—Referenced in FIG. 8(10). Again referencing FIG. 1, Suction cups(5) may also be attached by glue, resins or any other suitable means and are not restricted to keyhole fittings—Referenced in FIG. 8(10). Again referencing FIG. 1, in the preferred embodiment these suction cups(5) are approximately 2 to 2 and ½ inches in diameter. They are capable of adhering to any non-porous surface.

Any size, number or array of suction cups(5) could be used to anchor the base(8) to use this disclosed invention.

The preferred embodiment of the Go Anywhere Fishing Line Reel Loader is made entirely of plastic. It could be made from wood, metal or any combination of materials. To form the bendable tension rod(1) any flexible material could be used.

To operate the Go Anywhere Fishing reel Line Loader attach the base(8) to any non-porous surface by means of the suction cups(5). Next place a fishing line supply spool(3) on the base(8) between the two opposing side walls(9). Select a through hole(2) on one wall that is lower than the center hole(4) in the line supply spool(3). Next put the plastic bendable tension rod(1) through the selected through hole(2) and thread the plastic bendable tension rod(1) through the center hole(4) of the line supply spool(3) and back down and through corresponding through hole(2) on opposite side wall(9). Pull fishing line(6) from under line supply spool(3) and out to the side of the base(8). With plastic bendable tension rod(1) now forming an arc from one side wall(9)

through line supply spool center hole(4) and through opposing side wall(9) you have downward pressure on line supply spool(3). This downward pressure holds the line supply spool(3) firmly in place. The downward pressure of the plastic bendable tension rod(1) also will produce friction between the top of the base(8) and the line supply spool(3) when fishing line(6) is pulled from line supply spool(3) causing it to spin. This friction will put tension on the fishing line(6) being pulled from the line supply spool(3) allowing for tight winding onto fishing reel spool (not shown). Once you have line supply spool(3) and plastic bendable tension rod(1) in place, pull enough fishing line(6) off of the line supply spool(3) to thread through your fishing rod guides and tie line to fishing reel spool (not shown). Stand perpendicular to line loader and turn crank of fishing reel to load fishing reel spool (not shown). If you are not satisfied with the tension on the fishing line(6) or want to load a higher or lower test line choose the next higher through hole(2) for less tension or choose the nest lower through hole(2) for more tension. In this manner any type of fishing rod and reel combination, spinning, bait casting or fly may be loaded correctly with fishing line. In addition, the width and length of the disclosed Go Anywhere Fishing Reel Line Loader and the ascending placement of the through holes(2) allows you to use most if not all commonly used sizes of the line supply spools(3) both in width and height.

We claim:

1. A fishing reel line loader which has three components working together to enable a single person working almost anywhere by themselves, to load a fishing reel spool with fishing line from a line supply spool comprising:
   (a) a base with two opposing side walls rising from each end with 9 corresponding through holes in each said side wall arranged in ascending order;
   (b) a plastic bendable tension rod capable of passing through one said side wall travelling the length of the said base and protruding out of other side wall;
   (c) a plurality of suction cups attached to bottom of said base to attach said line loader to any non-porous surface.

2. The fishing reel line loader according to claim 1, wherein said line supply spool of varying widths or heights is placed on the said base between the said opposing side walls of said line loader and the said plastic bendable tension rod is threaded from the outside of one said side wall through a said through hole which is lower than the center hole of said line supply spool and down and through corresponding said through hole on said opposing side wall two effects occur; downward pressure on the said line supply spool and friction between said line supply spool and said base of said line loader when a fishing line is pulled from said line supply spool.

3. The fishing reel line loader according to claim 2, wherein an arc produced on said plastic bendable tension rod by inserting said plastic bendable rod puts downward pressure on said line supply spool holding it firmly in place.

4. The fishing reel line loader according to claim 2 wherein an arc produced on said plastic bendable tension rod by inserting the said plastic bendable tension rod puts downward pressure on said line supply spool creating friction between the said line supply spool and the said line loader base as said fishing line is pulled from said line supply spool creating the appropriate amount of tension on said fishing line to load fishing reel spool when said fishing line is threaded through fishing rod guidelines and tied to fishing reel spool and the fishing rod and reel are held perpendicular to said line loader and the fishing reel crank is turned.

5. The fishing reel line loader according to claim 2, wherein appropriate tension applied to said fishing line to correctly load a fishing reel spool can be achieved by placing a said line supply spool on said base and inserting said plastic bendable tension rod and this tension on said fishing line may strengthened by choosing a lower said through hole in said side wall or lessened by choosing a higher said through hole in said side wall.

6. The fishing reel line loader according to claim 1, wherein a length of said base from said sidewall to said sidewall of at least 6 inches and a width of said base of at least two inches.

7. The fishing reel line loader according to claim 1, wherein the line loader is made entirely of plastic.

* * * * *